United States Patent [19]

Omura

[11] Patent Number: 4,542,969

[45] Date of Patent: Sep. 24, 1985

[54] PORTABLE DAYLIGHT ELECTROPHOTOGRAPHY APPARATUS

[76] Inventor: Yoshiaki Omura, Apt. 8-I 800 Riverside Dr., New York, N.Y. 10023

[21] Appl. No.: 429,343

[22] Filed: Sep. 30, 1982

[51] Int. Cl.[4] ........................ G03B 19/00; G03B 41/00

[52] U.S. Cl. ........................................ 354/354; 354/3; 354/62

[58] Field of Search ............................ 354/3, 62, 354; 250/324, 366; 128/630, 633, 665

[56] References Cited

U.S. PATENT DOCUMENTS

| | | | |
|---|---|---|---|
| 2,833,930 | 5/1958 | Walkup . | |
| 3,541,329 | 11/1970 | Roth . | |
| 3,864,035 | 2/1975 | Kuehnle | 355/14 |
| 3,994,283 | 11/1976 | Farley | 354/354 X |
| 4,011,568 | 3/1977 | Oughton | 354/3 |
| 4,222,658 | 9/1980 | Mandel | 354/354 |
| 4,386,834 | 6/1983 | Toolan | 354/3 |

OTHER PUBLICATIONS

*Rainbows of Life,* by Mikol Davis and Earle Lane, 1978, Preface and Technical Consideration.

Acupuncture & Electro-Therapeut. Res., Int. J., vol. 2, No. 1 & 2, pp. 43-86, 1976, Pergamon Press, printed in Great Britain.

Pehek et al., "Image Modulation . . . Photography", published in *Science,* vol. 194, No. 4262, pp. 263-270, Oct. 1976.

Choudhury et al., "High Voltage . . . Photography", IE (I) Journal-EL, vol. 60, Dec. 1979, pp. 61-66.

*Primary Examiner*—John Gonzales

*Attorney, Agent, or Firm*—Ladas & Parry

[57] ABSTRACT

This type of electrophotography is practiced using a device comprising a holder, a photographic film mounted in the holder, and a light-tight sleeve connected to the holder to enable an object to be placed in contact with the film. An electrode is disposed inside the holder on the opposite side of the film from the object under investigation. A pulse generator capable of producing high voltage pulses having a high-frequency component is connected to the electrode.

11 Claims, 3 Drawing Figures

PORTABLE DAYLIGHT ELECTROPHOTOGRAPHY APPARATUS

This invention relates to electrophotography, and more particularly to Kirlian photography.

In Kirlian photography, a corona discharge is established between the surface of an object under investigation (for example part of a human or animal body or a leaf) and a high voltage electrode plate, and the light emission of the corona discharge is recorded photographically. However, previously known devices for carrying out Kirlian photography have been cumbersome, and a portable self-contained device has not previously been produced.

According to a first aspect of the present invention there is provided a portable device for practising Kirlian photography, comprising a holder, a sheet-form member which is provided with a photosensitive emulsion and is mounted within said holder, light-tight enclosure means connected to said holder and defining a space for receiving an object under investigation, said space being bounded partly by said sheet-form member, whereby said object may be placed in contact with the sheet-form member, an electrode disposed within said holder on the other side of the sheet-form member from said space, a layer of electrically-insulating material disposed within the holder between the electrode and the sheet-form member, and pulse generator means having two terminals between which high voltage pulses having a high-frequency component are developed in use, one of said terminals being connected to the electrode and the other terminal being electrically isolated from the rest of the device.

According to a second aspect of the present invention there is provided a method of practising Kirlian photography, wherein an object under investigation is placed in darkness is contact with a sheet-form member which is provided with a photosensitive emulsion, and high voltage pulses having a high-frequency component are applied to an electrode which is disposed on the other side of the sheet-form member from the object under investigation and is separated from the sheet-form member by a layer of electrically-insulating material.

According to a third aspect of the present invention there is provided a method of practising Kirlian photography, wherein an object under investigation is provided with a coating of photosensitive emulsion and is placed in a light-tight chamber which contains an electrode which is electrically insulated from the object, and high voltage pulses having a high-frequency component are applied to the electrode.

For a better understanding of the invention, and to show how the same may be carried into effect, reference will now be made, by way of example, to the accompanying drawings in which.

Figure 1:
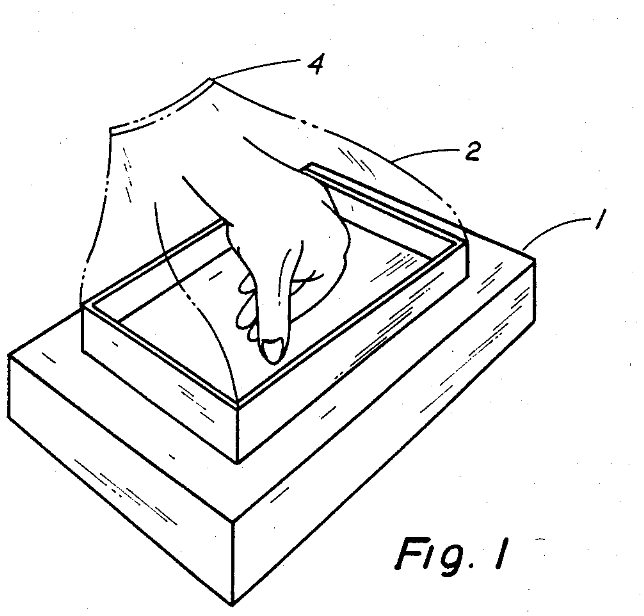
FIG. 1 shows a perspective view of an apparatus in accordance with the present invention.
Figure 2:
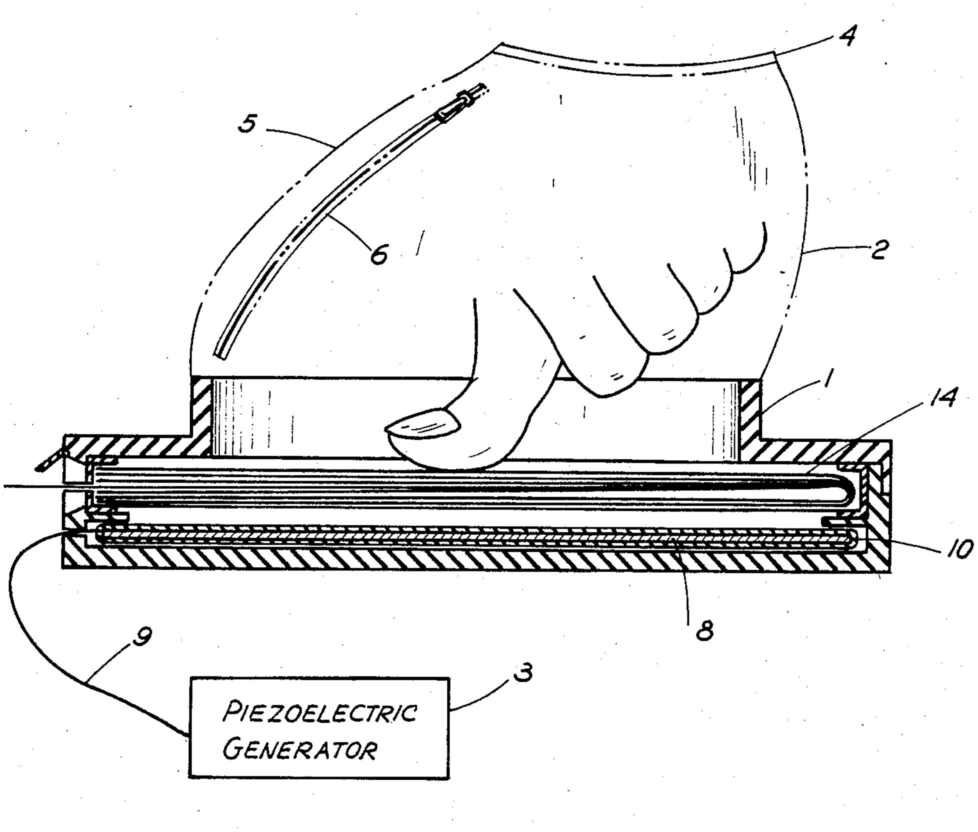
FIG. 2 shows a sectional view of the apparatus.

The apparatus illustrated in FIGS. 1 and 2 comprises a film holder 1, a light-impermeable sleeve 2, and a piezoelectric generator 3 sold under the trademark Conquer.

The film holder 1 is produced by removing the lens system from a conventional Polaroid camera. The lens system is replaced by the sleeve 2, which is sealed in light-tight manner to the film holder. The sleeve 2 is made from a double thickness of black cloth, the outer thickness being a finely-woven nylon material with a layer of black rubber adhered to the interior thereof, and the inner thickness being finely-woven wool. The two thicknesses are thus substantially opaque to normal daylight. The sleeve is provided at its end further from the camera body with an elastic cuff 4 through which an object under investigation may be introduced into the interior of the sleeve. The sleeve is also provided at one side with an appendix 5, along one edge of which both thicknesses of cloth are provided with zippers 6, so that larger objects may be introduced into the enclosure and may be placed in a desired position therein by means of the user's hand, introduced into the sleeve through the cuff 4.

A metal electrode 8 covered with a sheet of insulating material 10 is placed inside the film holder 1, and a hole is drilled in the film holder to pass a wire 9 for connecting the electrode 8 to the piezoelectric generator 3. The electrode is introduced into the film holder by opening the film holder and placing the electrode in the bottom of the space provided for the film pack, and then the film pack is inserted on top of the electrode and the film holder is closed. The electrode itself comprises a sheet of aluminum foil having the wire 9 connected to several points thereof, and the insulating material 10 comprises a single layer of Mylar. The Mylar may be 1 to 50 mil. thick, and is preferably 5 to 10 mil. thick. The Mylar is provided in order to insulate the object under investigation from the electrode, since conventional photographic film is deliberately made to be a poor insulator in order to avoid the build up of static electricity when the film is advanced, with consequent sparking at the surface of the film causing the film to be exposed.

The film that is preferably used is Polaroid black and white high speed film, ASA 3000. The piezoelectric generator 3 has two terminals, one positive and one negative. The wire 9 is connected to one of the terminals of the piezoelectric generator, and the other terminal is electrically isolated from the other components of the device.

In order to use the device illustrated in FIGS. 1 and 2, the object to be photographed is introduced into the sleeve 2 by way of the cuff 4 and is placed on top of the film 14 in the film pack 12. As illustrated in FIGS. 1 and 2, the object being photographed is a human thumb. The piezoelectric generator is operated to apply several, for example 30, high voltage pulses to the electrode 8 and the film 14 is removed from the film holder and is developed in the normal way. It is found that a characteristic image is produced, with the film being exposed in accordance with the pattern of the thumbprint, within a relatively light border.

The piezoelectric generator produces a peak potential difference of 10 kV to 25 kV, preferably 20 kV between its positive and negative terminals. The pulses are very short, the duration of each pulse at 36.8% ($=e^{-1}$) of the maximum amplitude of the pulse being about 30 μs. Thus, the pulses produced by the piezoelectric generator have a high frequency component. It is not essential to use a piezoelectric generator to produce the pulses, since any source of high voltage pulses having a high frequency component may be used. For example, a high frequency (5 kHz to 1 MHz) sine wave generator could be used. The connection of the electrode 8 to a 10 KHz sine wave generator for one second would normally produce a satisfactory image. Moreover, it is not essential that the peak amplitude of the pulses should be large. It is believed that the important factor is that the generator should produce pulses having a large time derivative of voltage, and that provided the time derivative is high enough a generator having a relatively low peak voltage may be used, the lower peak voltage being compensated by using a larger number of pulses in order to obtain a given degree of exposure of a given object.

As mentioned above, one terminal of the piezoelectric generator 3 is connected to the electrode 8 and the other terminal of the generator is isolated from the other components of the device. Thus, an electrical circuit is not established. However, the rapidly changing potential of the electrode 8 establishes a changing electric field. When the field increases it causes ionization of gas molecules between the object and the film. When the electric field collapses, the ions recombine with emission of photons. Moreover, increases in the electric field cause electrons of the gas molecules to be raised to higher energy levels, and when the field collapses the electrons fall back to lower energy levels with emission of photons. The intensity of emission of photons depends on the magnitude of the electric field that is produced, and this in turn depends on the impedance of the object under investigation. Thus, local variations in the impedance of the object become apparent when the film is developed, light areas of the image corresponding to areas of the object of low impedance.

Since the electric field is produced by virtue of the rapid changes in potential of the electrode 8, the magnitude of the field that is produced in the region of the object under investigation depends upon the electrical resistance between the electrode and the object. As note above, the resistance of the film itself is relatively low. The Mylar sheet, which is provided to insulate the object from the electrode 8, should be as thin as possible in order to maximize the electric field, yet should not be so thin as to be broken down by the electric field.

It has been found that a satisfactory image can be produced with many fewer pulses from a given generator if the object under investigation is connected to one end of a length of wire, for example 1 or 2 m long, and the wire extends freely out of the device by way of the sleeve. The other end of the wire is not connected to the generator, and is in fact electrically isolated from the various components of the device. The mechanism whereby the wire permits use of fewer pulses, presumably by permitting the generation of higher fields, is not understood.

Since the device makes it possible to render visible local variations in the impedance of the object under investigation, it permits diagnosis of conditions which affect the impedance of the skin of a human being or animal. For example, it has been found that there is a correlation between skin impedance and rheumatoid arthritis. It has also been found that skin impedance decreases when blood flow is increased by the administration of certain drugs, for example morphine, and skin impedance decreases when blood flow decreases upon administration of an antagonist to the drug. See, generally, Y. Omura, Acupuncture, Infra-red Thermography and Kirlian Photography, Acupuncture & Electro-Therapeut. Res., Int. J., Vol. 2, No. 1 & 2, 43-86 (1976).

Figure 3:
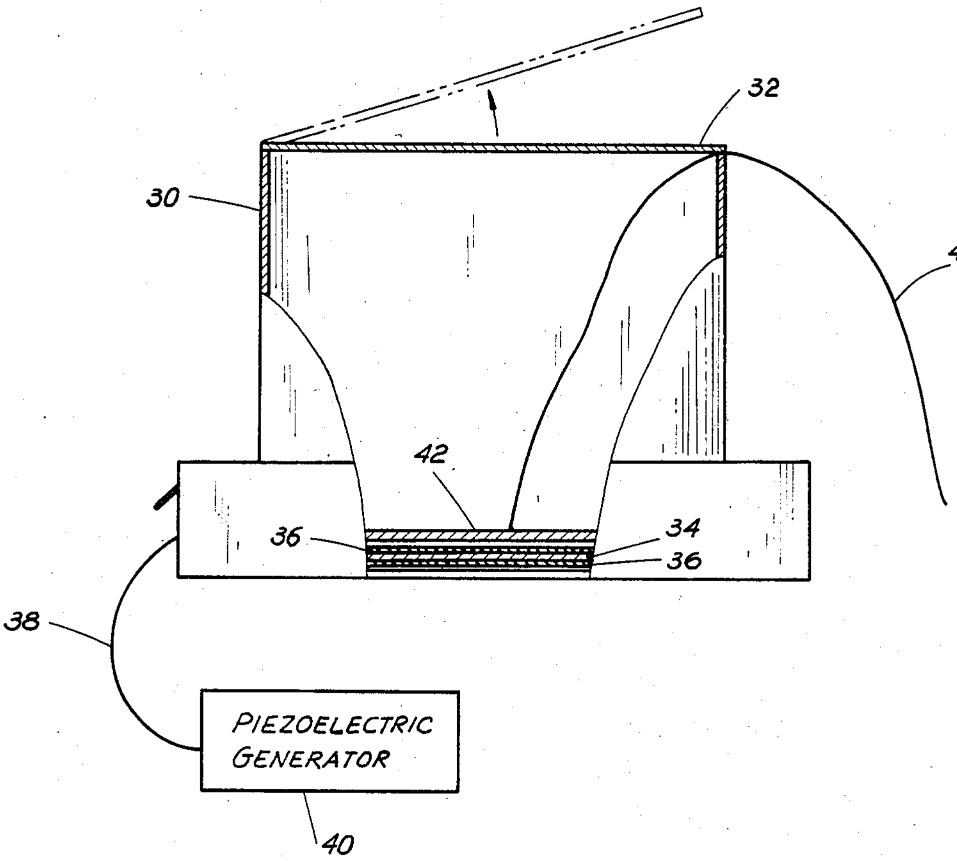
FIG. 3 shows a modified form of apparatus.

The modified form of device, illustrated in FIG. 3, is used to carry out photosensitive emulsion micro-Kirlian photography of cells. It is known to carry out radioactive tracer tests upon an animal to determine whether an element tends to accumulate in a given organ by injecting a small amount of radioactive material containing the element and removing the organ to ascertain the concentration of the radioactive material in the organ. This may be done by taking a thin slice of the organ and mounting it upon a glass slide, and dipping the specimen, comprising the slice mounted on the slide, into a bath of molten photosensitive emulsion, removing the specimen from the bath of emulsion while leaving a film of emulsion upon the specimen, allowing the film of emulsion to cool and set, and storing the specimen in darkness for one or two months. Radiation from the radioactive material in the organ exposes the photosensitive emulsion in accordance with its intensity, and at the end of the storage period the coating of emulsion on the specimen can be developed and fixed to render visible the distribution of radioactive material in the slice of organ. In a modification of this technique, the specimen, having the coating of emulsion thereon, is placed in the device illustrated in FIG. 3. This device comprises a light-proof box 30 having a lid 32 and having an electrode 34, covered with a layer of insulating material 36, disposed in the bottom thereof. A wire 38 connects the electrode 34 to one terminal of a piezoelectric generator 40. A metal plate 42 is placed on top of the specimen, and a wire 44 is connected to the metal plate and extends out of the box 30 through a small gap between the lid and the wall of the box. The specimen is placed in the box in darkness, and the lid is closed. The piezoelectric generator 40 is then operated to apply 500 high voltage pulses to the electrode 34, and the specimen is then removed from the box, in darkness, and is developed and fixed. The image that is produced in the photosensitive emulsion reflects variations in impedance of the slice or organ over the area of the slice, and examination through a microscope reveals that some cells have characteristic areas of low impedance.

The piezoelectric generator 40 that is used in the device of FIG. 3 may be same as the piezoelectric generator 8 used in the device of FIGS. 1 and 2. The emulsion that is used is a gel form nuclear research emulsion type K5 size A made by Ilford Limited, Essex, England.

I claim:

1. A portable device for practicing Kirlian photography, comprising a holder, a film pack having sheet-form members which are each provided with a photosensitive emulsion the film pack being mounted inside said holder, light-tight enclosure means connected to said holder and defining a space on a first side of said film pack for receiving an object under investigation, said space being bounded partly by a top most one of said sheet-form members, whereby said object may be placed in contact with the top most sheet-form member, a foil electrode disposed entirely inside said holder on an opposite side of the film pack from said space, a layer of electrically-insulating material disposed entirely within the holder between the electrode and the film pack, and pulse generator means having two terminals between which high voltage pulses having a high-frequency component are developed in use, one of said terminals being connected to the electrode and the other terminal being electrically isolated from the rest of the device.

2. A device as claimed in claim 1, wherein said electrode comprises a sheet of aluminum foil.

3. A device as claimed in claim 1, wherein the layer of electrically insulating material extends completely around the electrode.

4. A device as claimed in claim 1, 2 or 3, wherein the layer of electrically insulating material comprises a layer of Mylar from 1 to 50 mil. in thickness.

5. A device as claimed in claim 4, wherein the layer of Mylar is from 5 to 10 mil. in thickness.

6. A device as claimed in claim 1, wherein said pulse generator means comprise a piezoelectric generator which develops a potential difference of from 10 kV to 25 kV between its terminals.

7. A device as claimed in claim 6, wherein said piezoelectric generator develops a potential difference of substantially 20 kV between its terminals.

8. A device as claimed in claim 1, 6 or 7, wherein the duration of each pulse is of the order of 30 $\mu$s.

9. A device as claimed in claim 1, 6 or 7, wherein each pulse has a high-frequency component having a frequency of from 5 kHz to 1 MHz.

10. A device as claimed in claim 1 in which the sheet form members are poor electrical insulators.

11. A device as claimed in claim 1 further comprising a freely extending length of conductive material, the length of conductive material being for attachment to the object.

* * * * *